July 12, 1927.

J. W. GREER

CONVEYER

Filed Jan. 26, 1925

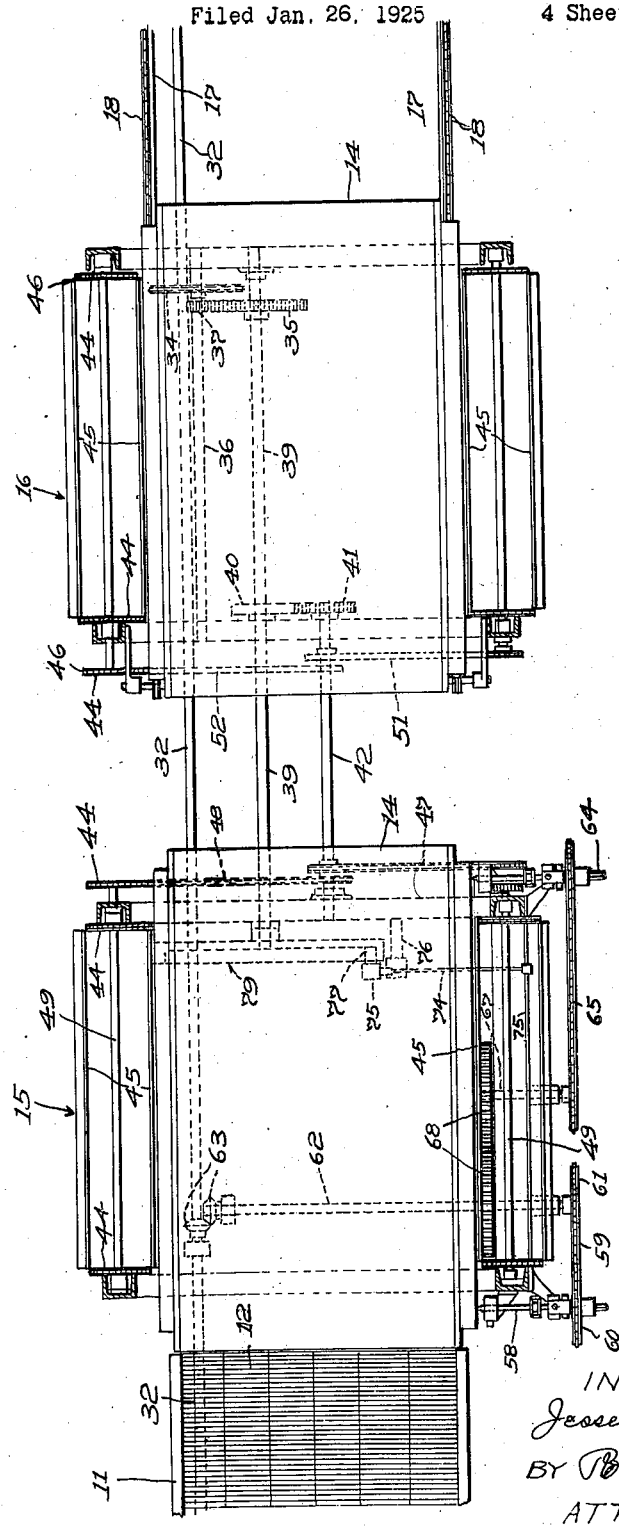

July 12, 1927.                    J. W. GREER                    1,635,406
                                  CONVEYER
                            Filed Jan. 26, 1925              4 Sheets-Sheet 4
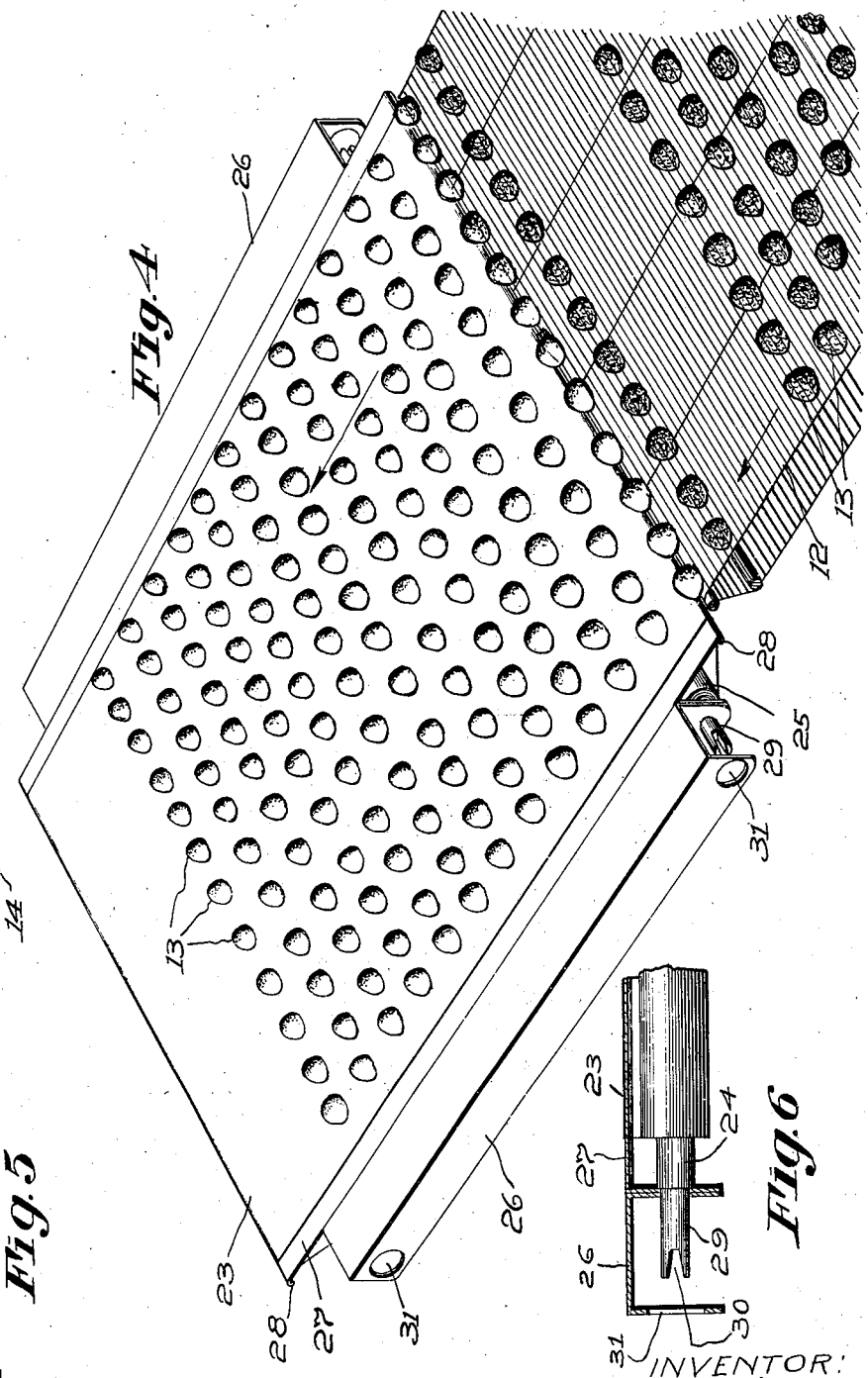
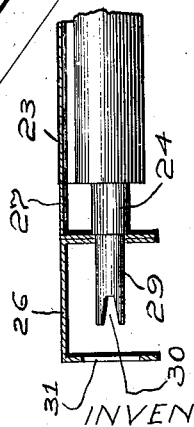
INVENTOR:
Jesse W. Greer
BY
ATTORNEY Patented July 12, 1927.

1,635,406

UNITED STATES PATENT OFFICE.

JESSE W. GREER, OF CAMBRIDGE, MASSACHUSETTS.

CONVEYER.

Application filed January 26, 1925. Serial No. 4,762.

This invention relates to conveyers of the type employing a series of trays that travel in an endless path, and more particularly to a covering sheet for the trays and means for feeding the sheets relative to their trays.

Conveyers of the endless belt type and also of the type employing a series of trays that travel in an endless path, have been extensively used heretofore in the manufacture of cakes, candies and other confections to convey the confections from an oven or coating machine to packing tables, but both types of conveyers as heretofore employed are open to objections.

The use of an endless belt to convey the hot confections to the packing tables is open to the objection that many confections require at least fifteen minutes to cool, and as a result an excessively long belt is required to move the confections for this length of time before they reach the packing tables. Attempts have been made to overcome this difficulty by placing upon the belt plaques consisting of sheets of paper having a glazed surface, and these plaques are removed from the belt by hand with the hot confections thereupon, but this involves considerable labor and the plaques are hard to handle without displacing or marring the still warm confections and it is difficult to keep the plaques in place upon the belt.

It has also been proposed to employ a series of trays that travel along an endless path to carry the confection from the oven or coating machine to the packing tables. This has the advantage that the trays may be passed along different runs before they reach the packing tables, but is open to the objection that difficulty is experienced in placing the freshly coated confections, or cakes fresh from the oven, upon the trays without injuring the confections. Heretofore the confections have been deposited upon the trays by advancing the trays beneath an endless belt, or apron carrying the confections, but this causes the confections to drop a slight distance in passing from the upper run of the apron to a tray, which is likely to injure the soft confections.

The present invention is therefore directed to novel means for placing the hot confections upon the trays without injuring or marring the confections.

One important feature of the present invention resides in a tray having a covering sheet extending over its upper face and in means for feeding the sheet over the surface of the tray to carry confections to different positions upon the tray.

Another feature of the invention resides in means for supporting a tray adjacent the delivery end of an endless conveyer, and in means for feeding a covering sheet over the surface of the tray to carry the confections presented to an edge of the tray to different positions upon the tray.

Another feature of the invention resides in means for moving a series of trays step by step in a vertical direction, and in means for placing confections upon each tray while it is at rest in a predetermined position along its path of travel.

Still another feature of the invention resides in means for feeding the covering sheet over the tray while confections are being delivered to the tray to carry the confections thereupon, and in other means for feeding the covering sheet in the reverse direction before it again reaches the tray loading position.

Other features of the invention and novel combination of parts in addition to the above will be hereinafter described in connection with the accompanying drawings which illustrate one good, practical form of the invention.

In the drawings:—

Fig. 3 is a sectional view on line 3—3 of Fig. 1.

Fig. 4 is a perspective view of a tray constructed in accordance with the present invention and shown in position to receive confections from a supply apron.

Fig. 5 is a side view of the tray of Fig. 4 with part broken away; and

Fig. 6 is a fragmentary sectional view of a part of the tray.

Figure 1:
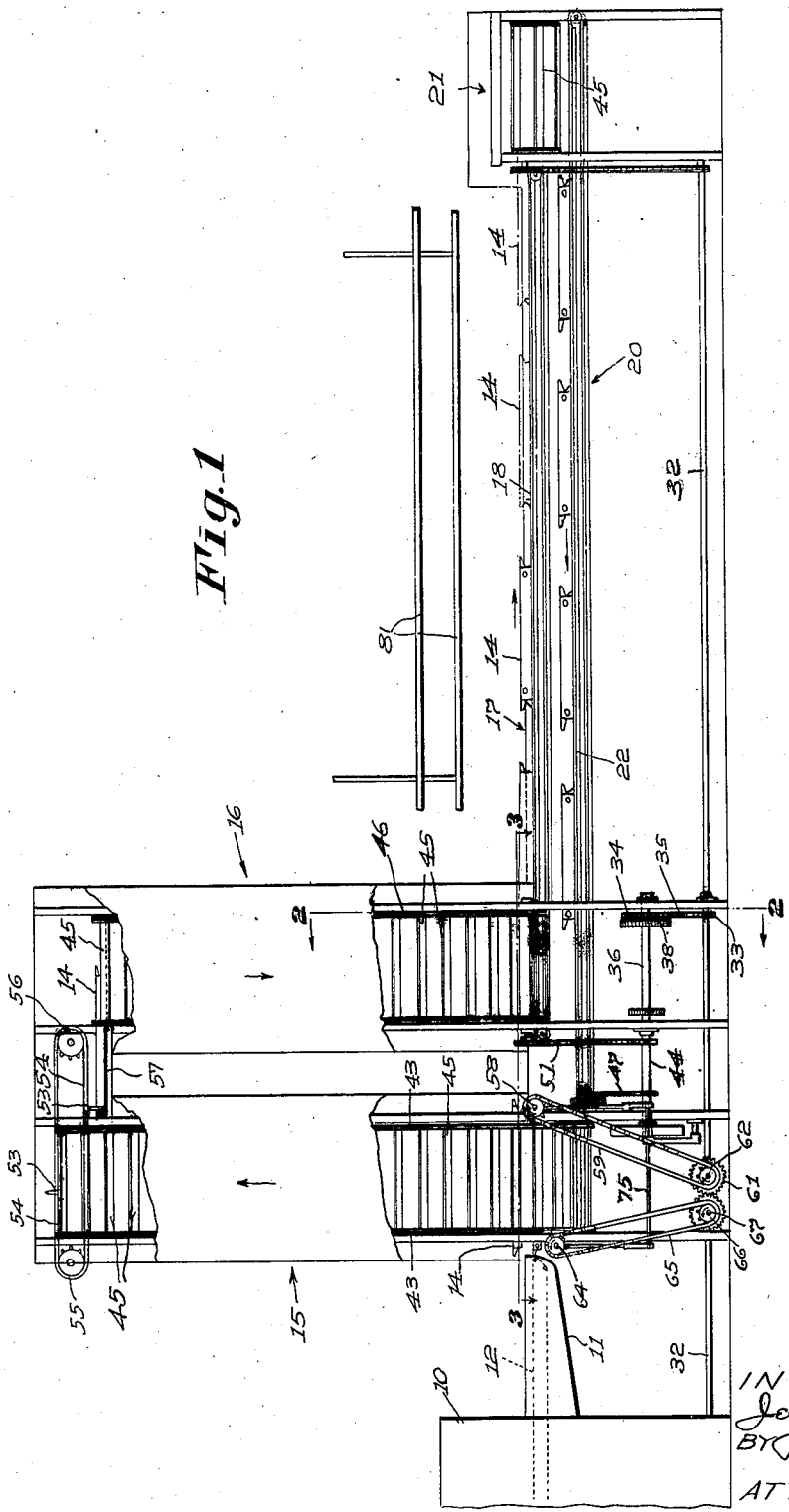
Fig. 1 is a side view of the complete machine of the present invention with part of the enclosing casing broken away.

Trays constructed in accordance with the present invention and having a covering sheet for advancing the confection over the face of the tray may be employed for various purposes, and in the drawings these trays are shown as used in an endless conveyer of the type having cooling towers for supporting one tray above the other and having means for moving the trays in a vertical direction step by step.

Figure 2:
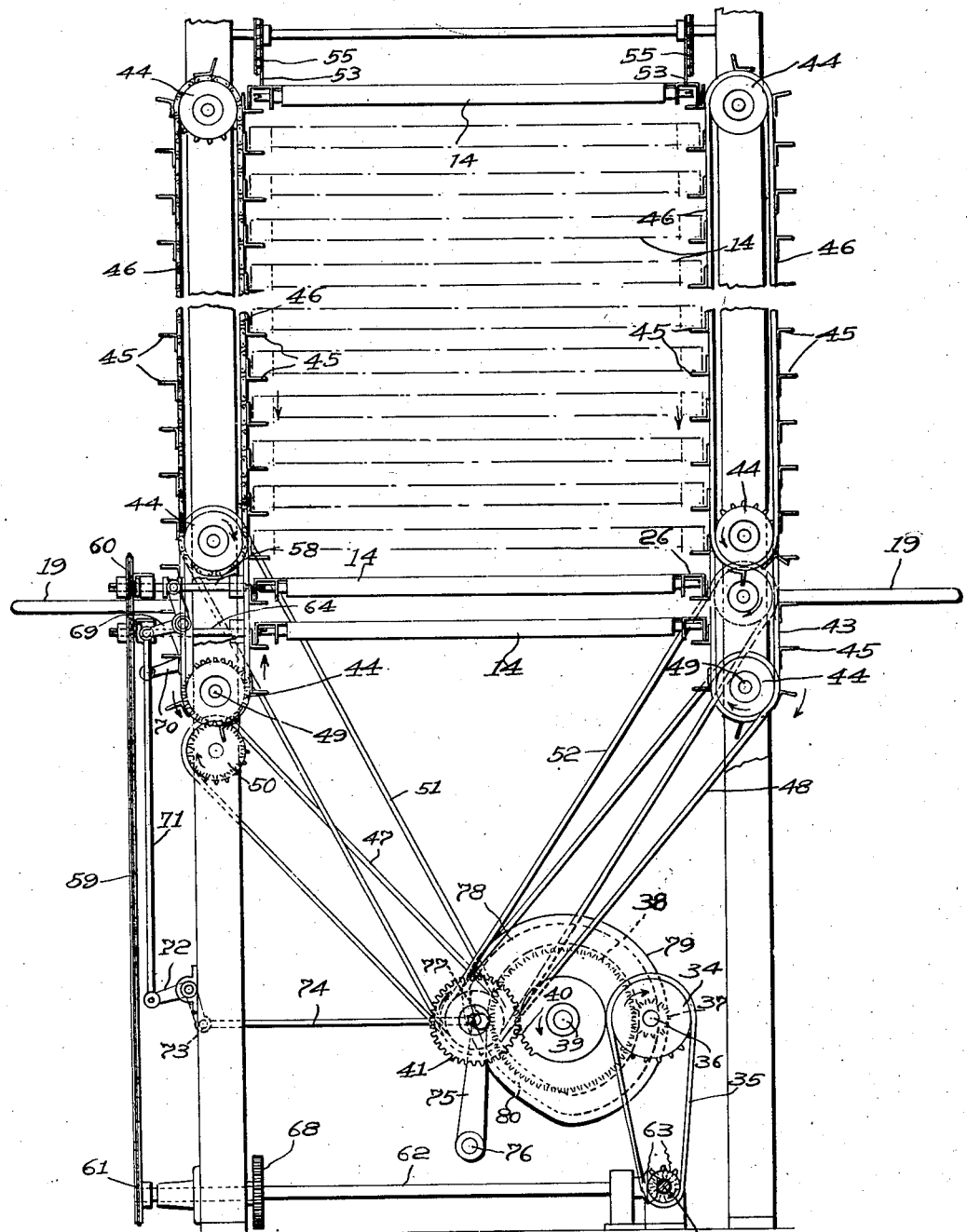
Fig. 2 is an enlarged sectional view on line 2—2 of Fig. 1.

Referring to the drawings, 10 designates an oven or a coating machine having a laterally extending table 11 for supporting the endless conveyer belt or apron 12. This apron serves to convey cakes, biscuits or coated confections 13 to the trays 14. In the construction shown the trays are caused to travel along a comparatively long path before they reach the packing tables, so that a substantial amount of time will elapse before a loaded tray reaches the packing table, this being desirable to give the confections sufficient time to cool and the coating to harden before they reach the packing table. To this end trays are introduced at the lower end of the vertical tower 15 and are moved upwardly in this tower until they reach the top thereof, whereupon they are moved laterally to a second tower 16 and then passed downwardly in the tower 16 until they reach a horizontally extending runway 17 along which they are advanced by endless chains 18. The packing tables 19, where the boxes are filled by hand, may be disposed along each side of the runway 17, as shown in Fig. 2. At the end of the runway 17 is provided means for lowering the trays to a second horizontally extending runway 20. The lowering means of the construction shown comprises a short tower 21, and when the trays have reached the lower runway 20 they are moved along this runway towards the first mentioned tower 15 by endless chains 22.

In the construction shown the trays are moved vertically within their towers step by step, this movement being desirable in order that each tray may come to rest for a short period of time in alignment with the upper run of the conveyer apron 12, so that one edge of the tray 14 will be held in close proximity to the outer end of the upper run of the apron 12, as best shown in Fig. 5, so that the confections may be readily transferred from the apron 12 to the trays 14.

As stated, an important feature of the present invention resides in the construction of the trays, whereby each tray 14 is provided with a covering sheet 23. These sheets may be formed of paper, preferably having a smoothed glazed surface, or if a stronger and more durable covering surface is desired, they may be formed of cloth having a smooth glazed surface. In order to advance the confections 13 presented to one edge of the tray by the apron 12, to different positions upon the tray it is necessary to feed the covering sheets relatively to the tray surface. This may be accomplished by various arrangements, and in the construction shown a covering sheet 23 having a much greater length than the tray is employed, and one end of the covering sheet is secured to a roll 24, while the opposite end of the covering sheet is secured to a roll 25. Each tray may be formed of spaced angle irons 26, to which is secured an approximately square sheet 27, preferably formed of metal. The opposite ends of the rolls 24 and 25 may be journaled in the angle irons 26, as best shown in Fig. 6, and the rolls may be split longitudinally to form a crack between them, in which the end of the covering sheet may be secured by clamping the two halves of the roll together with the end of the sheet between them. The covering sheet, as will be apparent from the drawings, passes from one of the rolls about a rounded edge 28 of the tray and then over the upper face of the tray and about a second rounded edge 28 to the other roll. The arrangement is such that the sheet 23 may be advanced in one direction over the surface of the tray by rotating the roll 24 and may be moved in the opposite direction by rotating the roll 25. Each roll has a projecting spindle 29 slotted at its end as at 30, to receive driving means to be described, and an opening 31 is formed in each angle iron 26 to receive the driving means.

From the above description, it will be seen that if the covering sheet 23 is fed in the direction indicated by the arrow in Fig. 4, as the confections 13 are delivered to an edge of the tray by the conveyer apron 12, the confections will be smoothly transferred from the apron to the tray and will be advanced over the face of the tray to the desired position, and when a tray is completely loaded the feeding movement of the covering sheet is stopped. The loaded tray may then be moved out of alignment with the conveyer apron 12 and an empty tray presented in its place. It is apparent that confections should not be delivered by the conveyer 12 during the short period of time that elapses while an empty tray is being substituted for a full tray. This difficulty, however, is easily overcome by omitting the confections across a portion of the apron 12 as shown in Fig. 4, so that the apron 12 may rotate continuously, but no confections will be delivered at the end of the upper run of the conveyer during this short period of time, it being understood, of course, that the spaces upon the apron 12 from which the confections are omitted should be arranged at intervals along the upper run of the belt 12 a distance apart equal to the length of a tray 14, so that just enough deposits will be placed between two of these spaces to fill a tray. It will be understood that the substitution of one tray for another must be performed in timed relation with the rate of travel of the apron 12.

As stated, means is provided for advancing the trays intermittently or step by step within the towers, and the means shown to this end will now be described. The various operating parts may be driven from the main shaft 32 extending from the base of the coating machine 10, and this shaft may be driven by a motor, not shown. The shaft 32 is provided with a small sprocket 33 which serves to drive a larger sprocket 34 by means of the chain 35. The sprocket 34 is rigidly secured to a shaft 36 provided with the pinion 37 which drives the gear 38 rigidly secured to the relatively long shaft 39, and upon the shaft 39 is mounted the sector gear 40, the teeth of which are provided thru only a small portion of a complete circle, and these teeth are adapted to engage and periodically rotate the gear 41 rigidly secured to the shaft 42.

Each tower is approximately square in cross-section, as best shown in Fig. 3, and at each of the four corners of the tower 15 is provided an endless chain 43, and these chains pass around and are driven by sprocket wheels 44 supported near the lower and the upper ends of the tower. Tray supporting angle irons 45 are secured to each pair of chains 43, the arrangement being such that in tower 15 the angle irons upon the inner run of each chain 43 move upwardly as the chains are driven, and the angle irons upon the outer run of these chains move downwardly, as indicated by the arrow in Fig. 2. The construction of tower 16 is similar to that of tower 15, except that the chains 46 which operate the angle irons 45 travel in the reverse direction, that is the angle irons upon the inner run of the chains 46 move downwardly, while those on the outer run move upwardly.

One pair of chains 43 within the tower 15 is driven from the shaft 42 by the sprocket chain 47, and the other pair of chains 43 is driven by the sprocket chain 48 from this shaft. The sprocket wheels which drive the chains 43 to operate the angle irons at one side of the tower 15 must necessarily be driven in an opposite direction from the sprocket wheels which drive the other pair of chains 43, and the driving chain 47 therefore does not directly drive the shaft 49 which supports the sprocket 44, but drives a sprocket 50 which in turn drives the sprocket 44. The chains 46 within the tower 16 are driven from the shaft 42 by the sprocket chains 51 and 52, and it will be seen that since the gear 41 is driven intermittently by the gear segment 40 a step-by-step movement will be imparted to the angle irons within towers 15 and 16, so that the trays which rest upon these angle irons will be moved upwardly step-by-step within the tower 15, and downwardly step-by-step within the tower 16.

As each tray reaches the upper end of the tower 15 it is moved laterally by projections 53 upon laterally extending chains 54 which pass around the sprockets 55 and 56. A short runway 57 is provided between the towers 15 and 16 in position to receive a tray which has reached its uppermost position within the tower 15 so that as a tray is moved laterally by projections upon the chains 54, it slides along the runway 57 on to a pair of angle irons at the upper end of the tower 16 and the tray is then moved downwardly step by step within the tower 16. As each tray arrives at the bottom of the tower 16 it is moved laterally along the runway 17 by projections upon the chains 18, and upon reaching the further end of the runway 17 it is lowered to the lower runway 20 by angle irons 45 within the tower 21, and which operate the same as the angle irons within the tower 16.

As each tray moves downwardly within the tower 21 to the lower runway 20, it is advanced along this runway (in the direction indicated by the arrow) by the chains 22 until it reaches the base of the tower 15, whereupon it slides upon a pair of angle irons 45 and is elevated step by step within the tower 15 in the manner above pointed out. All of the tray advancing mechanism above described is of course operated in timed relation, and thruout the entire operation of the machine the trays travel along the horizontal runways in spaced relation, so that the space between two adjacent trays is approximately the same as the width of the space shown upon the apron 12 in Fig. 4 and from which the confections are omitted. This is due to the fact that the interval of time required to move a tray the distance of one step is relatively short compared with the time required to load a tray.

It will be apparent that the towers 15 and 16 may be made as high as necessary to afford the confections sufficient time to cool while passing up one tower and down the other, so that by the time they arrive at the filling tables 19 they will be ready to be placed in boxes, and if desired means may be provided for causing a cooling current of air to pass continuously thru each tower.

Having described the construction by which the trays are moved along an endless path, which may be designed to accommodate any number of trays, means will now be described for advancing the covering sheet 23 of a tray upon the arrival of such tray at the loading position, that is the position in which the upper surface of the tray lies in alignment with the upper run of the apron 12. The driving means for the covering sheet 23 may be variously constructed, and is shown in the drawings as consisting of a horizontally extending shaft 58 which is supported so that its inner end may be moved into and out of driving engagement with the notched end of a roller 24. In the construction shown, the shaft 58 is driven continuously by a sprocket chain 59 which passes about the sprocket 60 keyed to the shaft 58, and about a lower sprocket 61 rigidly secured to the shaft 62, and the shaft 62 is driven from the main shaft 32 by the bevel gears 63.

After a tray has been loaded by feeding the sheet 23 over its surface, it is desirable to feed the sheet in the reverse direction after the confections have been removed from the tray, and before the tray again arrives at the loading position. This is accomplished, in the construction shown, by a second shaft 64 similar to the shaft 58, and which is supported in position to operate the let-off roll of the tray 14, which is supported directly below the tray which is being loaded. The shaft 64 is driven by a chain 65, which chain is in turn driven by the sprocket 66 secured to a short shaft 67, and the shaft 67 is driven from the shaft 62 by the cooperating gears 68.

The shafts 58 and 64 are rotated continuously and means is provided for automatically moving the shaft 58 into operative engagement with a take-up roll of the tray which is being loaded, and at the same time automatically moving the shaft 64 into operative engagement with the let-off roll of the tray directly below the loading position. The means for moving the shafts 58 and 64 in the direction of their length consists of a bell crank lever 69 which operates the shaft 58, and a second bell crank lever 70 which operates the shaft 64. The bell crank levers 69 and 70 are connected by rods 71 to lower bell crank levers 72 and these two bell crank levers are connected by a rod 73 which is rocked by a connecting link 74 extending from the rod 73 to a rocking lever 75 pivoted at 76.

The upper end of the lever 75 is provided with a roller 77 which engages a groove 78 in a face of the cam 79. This cam is secured to and is rotated by the shaft 39. It will be noted that the cam groove 78 has a flattened portion 80 which lies closer to the axis of the driving shaft 39 than the major portion of the groove 78. The arrangement is such that the shafts 58 and 64 are held in the roll driving position during the greater portion of the complete rotation of the cam 79, but as the roller 77 engages the flattened portion of the slot 80 the operating shafts 58 and 64 are moved for a short period of time to the inoperative position, when they are out of engagement with the trays while one tray is being moved upwardly out of the loading position and an empty tray is being moved to the loading position.

After the trays have been used for a substantial length of time, it may be that the surface of the sheet 23 upon which the confections have been repeatedly placed has become worn to an extent that makes its further use impracticable. When this occurs a new portion of the sheet 23 may be presented to the confections by merely rendering the shaft 64 inoperative for a period of time, so that as each tray comes in alignment with the shaft it will fail to wind the covering sheet back, and as a result, when the tray reaches the leading position, instead of having the old used portion of the sheet 23 fed over the surface of the tray, a new surface will be fed over the tray and the worn portion of the sheet will be wound upon the take-up roll, where it may be stored until the entire sheet 23 is worn out. However, if desired, instead of rendering the shaft 64 temporarily inoperative, the take-up rolls may be rotated by hand sufficiently to bring a new portion of the covering sheet 23 into use. As the trays pass along the runway 17 the confections may be removed by the person working at the tables 19 and placed in boxes, and as the boxes are filled they are placed upon the shelves 81. The laterally extending chains 18, 22 and 54 do not partake of the step-by-step movement imparted to the chains 43 and 46, but operate continuously and may be driven direct from the main shaft 32.

It should be noted that the construction of the trays 14 is such that the cooling currents of air may come in contact with the under face of the sheet supporting surface 27 of the trays. This is desirable as it permits the confections upon the trays to be cooled more rapidly than they could be cooled if the under surface of each tray was not exposed.

What is claimed is:

1. A tray for supporting and conveying confections, comprising in combination, a supporting surface, a covering sheet for the tray extending over said surface, a take-up roll upon the tray upon which one end of the covering sheet is wound and a let-off roll upon which the other end of the sheet is wound, and means for rotating the take-up roll for feeding the covering sheet over said surface to advance confections over the tray as they are delivered to the sheet.

2. A tray for supporting and conveying confections, comprising in combination, a supporting surface, a covering sheet extending over said surface and possessing a length several times greater than is required to cover the tray, and means for feeding the covering sheet over said surface to advance confections across the tray as they are delivered upon the sheet, said means being operable also to present a new and unused portion of the sheet to said surface when a previous portion of the sheet has become worn.

3. A machine of the class described, comprising in combination, a series of trays, means for advancing the trays intermittently along a predetermined path, a conveyer for delivering confections to each tray as it reaches a loading position, a covering sheet for each tray, a feed roll for feeding the sheet over the tray to carry the confections upon the tray, a driver for said roll, and means for moving the driver into driving engagement with the roll and for withdrawing the driver when the tray is loaded.

4. A machine of the class described, comprising in combination, a series of trays, means for advancing the trays along a predetermined path, a conveyer for delivering confections to each tray as it reaches a loading position, a covering sheet for each tray, a take-up roll for feeding the sheet over the tray to carry the confections upon the tray and a let-off roll for the opposite end of the sheet, means for rotating the take-up roll while the tray is in the loading position, and means for winding the sheet back upon the let-off roll before the tray again reaches the loading position.

5. A machine of the class described, comprising in combination, a series of trays, a tower provided with means for supporting the trays one above the other and for moving the trays vertically step by step, a conveyer for delivering confections to each tray as it reaches the loading position, a covering sheet for each tray, a pair of rolls mounted upon each tray and adapted to be operated to wind the covering sheet upon either roll, and driving means supported at the loading position and operable to drive a roll to feed the covering sheet over the tray to carry the confections upon the tray.

6. A machine of the class described, comprising in combination, a series of trays, a tower provided with means for supporting the trays one above the other and for moving the trays vertically step by step, a conveyer for delivering confections to each tray as it reaches the loading position, a covering sheet for each tray, a pair of rolls mounted upon each tray and adapted to be operated to wind the covering sheet upon either roll, driving means supported at the loading position and adapted to drive a roll to feed the covering sheet over the tray to carry the confections upon the tray, and means for feeding the covering sheet in the reverse direction before it reaches the loading position.

7. A machine of the class described, comprising in combination, a tray, means for advancing the tray along a predetermined path, a conveyer for delivering confections to the tray, a covering sheet for the tray, rolls disposed at the opposite ends of the tray and upon which the end portions of the covering sheet are wound, and power means engageable with one of said rolls and operable to advance the covering sheet over the tray in timed relation with the feed of said conveyer to advance the confections delivered by the conveyer upon the tray.

8 A machine of the class described comprising in combination, a tray having its under face exposed so that cooling currents of air may be directed against the same, means for advancing the tray along a predetermined path, a conveyer for delivering confections to the tray, a covering sheet for the upper face of the tray, means adjacent each end of the tray for holding the end portions of the covering sheet in a coiled condition, and power means for advancing the covering sheet over the face of the tray in timed relation with the feed of said conveyer and adapted to wind the leading end of the sheet in a coil 9 A machine of the class described, comprising in combination, a tray, means for advancing the tray along a predetermined path, a conveyer for delivering confections to the tray, a covering sheet for the tray, rolls disposed at the opposite ends of the tray and upon which the end portions of the covering sheet are wound, and power means engageable with one of said rolls and operable to advance the sheet over the tray in timed relation with the feed of said conveyer to advance the confections delivered by the conveyer upon the tray, and means for advancing the sheet in the opposite direction to restore it to its original position In testimony whereof, I have signed my name to this specification

JESSE W. GREER.